United States Patent

[11] 3,577,898

[72] Inventor Herbert E. Bragg
 New York, N.Y.
[21] Appl. No. 633,250
[22] Filed Apr. 24, 1967
[45] Patented May 11, 1971
[73] Assignee Twentieth Century-Fox Film Corporation
 New York, N.Y.

[54] SUPPLEMENTAL ILLUMINATING OF FILM PLANE IN PHOTOGRAPHIC CAMERAS
 2 Claims, 10 Drawing Figs.
[52] U.S. Cl. ................................................. 95/11,
 355/71
[51] Int. Cl. ............................................. G03b 27/76
[50] Field of Search ............................................ 95/11;
 355/71, 77

[56] References Cited
 UNITED STATES PATENTS
 2,749,820 6/1956 Garutso ........................ 95/18
 3,068,772 12/1962 MacNeille ................... 95/44
 2,621,569 12/1952 Glassey ........................ 355/71X Primary Examiner—John M. Horan
Attorney—Albert M. Parker ABSTRACT: Facilities are provided for introducing additional light supplementing or varying the exposure of a piece of film at the same time that it is being exposed to light from an object forming an image on the film. One way this is done is by admitting light from the same source through passages around the lens mount to the film frame area. This light is admitted through holes drilled through the housing around the lens mount, which holes may be left open or may have small lenses, or color filters, inserted in them. Preferably, however, such holes or bores are filled with bundles of light transmitting fibers. Held close together in the holes, the fibers may be separated on emergence at the inner ends of the holes for maximum distribution of the supplemental light transmitted by them over the exposure area. The supplemental light transmitting devices increase the effective exposure of the film with respect to the radiant energy coming from the object available, without the invention, to produce the image. They also enable special effects to be produced in a variety of ways: for example, the color balance of multilayered color negative films may be altered; the apparent contrast of the developed image may be changed and various other controlled changes may be introduced with respect to the recorded color images. Diaphragm means, such as relatively rotatable overlapping perforated annuli, may also be used to control the supplemental light in various ways. Supplemental light may also be admitted through passages at other positions.

Patented May 11, 1971
3,577,898
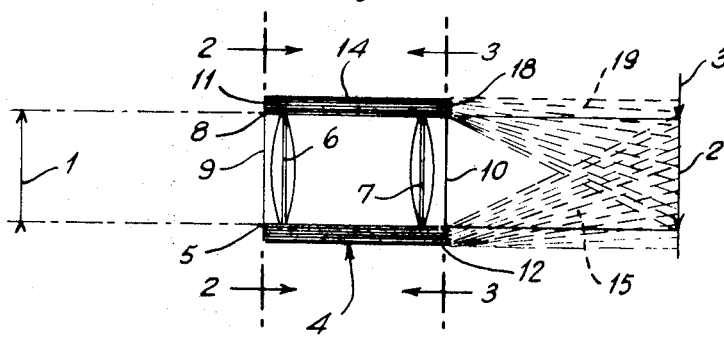
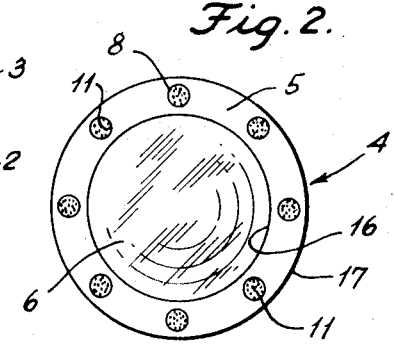
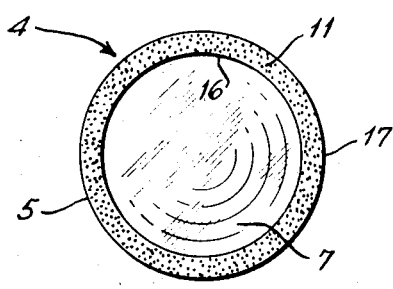
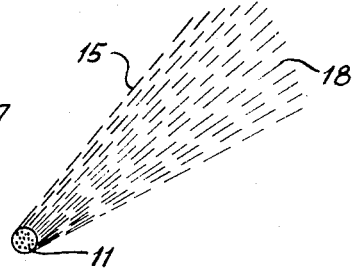
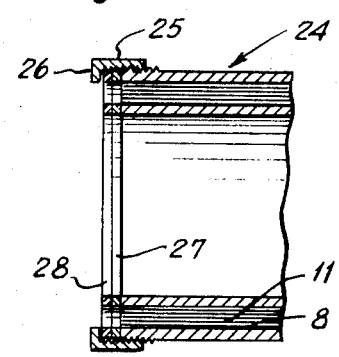
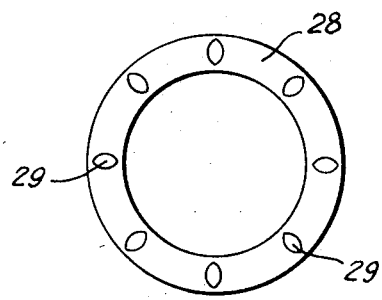
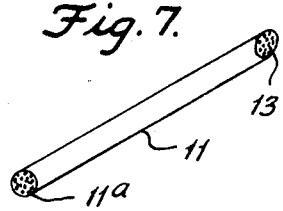
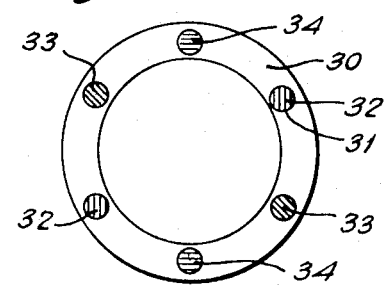
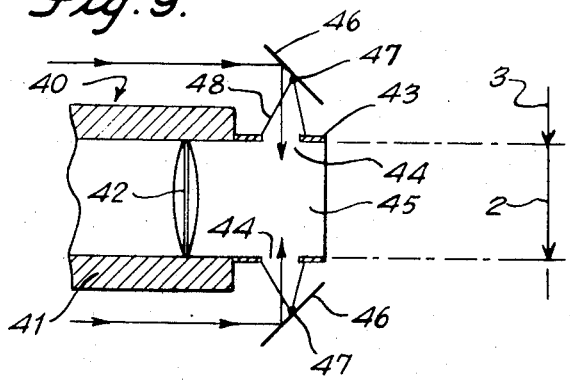
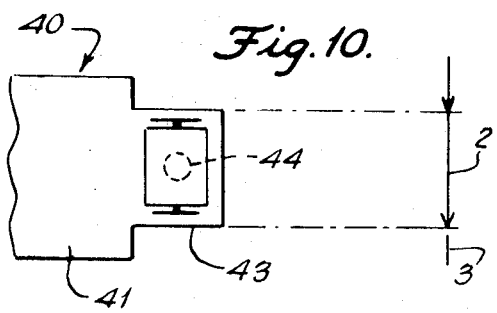
INVENTOR.
HERBERT E. BRAGG
BY
Albert M. Parker
ATTORNEY

SUPPLEMENTAL ILLUMINATING OF FILM PLANE IN PHOTOGRAPHIC CAMERAS

BACKGROUND OF THE INVENTION

1. Field of the Invention

The invention is concerned with the making of records photographically on a film carrying light-sensitive emulsion or emulsions. The films to be exposed may be for the production of still or motion pictures, either black or white, or in color. Specifically the invention provides means for transmitting more of the light available outside of the camera into position to illuminate the film frame than is transmitted through the image-forming lens. Additionally, or alternately, the supplemental light introduced, though not image forming in and of itself, may be controlled or colored in various ways to enhance the image or produce specific effects therein.

2. Description of the Prior Art

The prior art has recognized that in order to produce a photographic image on a film carrying a light-responsive emulsion a certain amount of radiant energy must fall upon the film before there is any response by way of image. Then when the threshold is reached where there is a useful incremental response in terms of silver, or, after processing, dye density, increasing at a rate determined by the characteristics of the sensitive layer, or layers, as the illumination on the film increases, resulting in the image-forming light commencing to form an image discernable against the so-called "fog" background, such image may nevertheless be lacking in many desirable characteristics. It is, for instance, devoid of such things as shadow detail. To produce a desirable image it has been thought necessary to increase the light intensity in order to use a more nearly linear portion of the well known sensitometric curve plotted between the log of the exposure, or light intensity on the film, and the log of response, or image density, to get an acceptable picture. Since the increases in illumination on the subject being photographed vary logarithmically instead of linearly, in order to achieve this desired increase in image density, it is apparent that such an increase in illumination considerably increases the expense when using artificial light in the studio.

One attempt to keep down the cost of light has resided in using faster, or more sensitive film, so that a satisfactory image can be produced at lower light levels. This however, is a somewhat self defeating idea because the faster the film, the grainier it becomes, and the less desirable the resultant image. Heretofore, however, no other ways have been known for enhancing the production of the desired image on the film at the film plane without increasing the intensity of illumination of the object.

SUMMARY OF THE INVENTION

The invention provides means for gathering more of the available light than is passed through the camera lens in photographing an object and using such gathered light to illuminate the film plane while the object being photographed is being imaged on the film through the camera lens. This has the effect of increasing the light intensity on the film without increasing the illumination on the subject.

Besides merely providing additional light without changing the intensity of the source, the invention provides the cameraman with tools to improve his work in other respects. This is by providing means to stop down the additional light if desired. Alternately, or in combination with such stopping, various means are provided to vary the color values of the additional light illuminating the film.

In the presently preferred form of the invention the supplementing of light at the film plane is achieved by means of bundles of light-transmissive fibers known to the optical art as "fiber optics." These bundles may be seated in holes bored or formed at positions about the lens ring. The fibers making up the bundles may be left bound together all the way to their opposite ends, or the fibers of the bundles may be separated to make sure of providing additional illumination uniformly. For varying color values separate filters may be used or the entrant ends of the bundles may themselves be coated with color filtering material.

Another modification of the invention provides for introducing the additional light into the zone of the film frame through the sidewall of the lens mount or housing therefor.

the invention, the invention while achieving the basic objective of providing more illumination at the film frame without increasing the light intensity of the source and thereby having the effect of increasing the speed of the film without making the change to a faster film, enables the cameraman to improve his pictures, correct undesired conditions and introduce special effects in an entirely novel, simple, manner.

BRIEF DESCRIPTION OF THE DRAWING

FIG. 1 is a diagrammatic view of an elementary lens system for imaging an object on a film showing the lens system as equipped with bundles of fibers in accordance with the invention.

FIG. 2 is an enlarged elevation taken on the line 2–2 of FIG. 1 and looking in the direction of the arrows.

FIG. 3 is a similar view taken on the line 3–3 of FIG. 1 and looking in the direction of the arrows.

FIG. 4 is a perspective view showing one of the fiber bundles having its fibers just in back of the exposed forward end of the bundle separated into individual fibers.

FIG. 5 is a fragmentary elevational view of a lens mount equipped with overlapping perforated discs.

FIG. 6 is an elevational view of the overlapping discs in accordance with FIG. 5 showing discs when so related as to partially close the light passage therethrough.

FIG. 7 is a perspective view of a fiber bundle maintained as a bundle throughout its length and skived at the inner end so as to direct the light emitted therefrom angularly; and FIG. 8 is a view similar to FIG. 2 but showing filters of different colors overlying the openings in the lens mount.

FIG. 9 is a fragmentary sectional view of a modification of the light-admitting system of the invention; and FIG. 10 is a plan view thereof.

DESCRIPTION OF THE PREFERRED EMBODIMENTS

The diagrammatic illustration of the application of the invention to photography as seen in FIG. 1 shows an object at 1 being imaged at 2 on film carried in the film frame 3 of the camera by means of lenses in a lens mount system, generally indicated at 4. This system embodies a lens mount here illustrated as a cylinder 5 carrying imaging lenses 6 and 7 shown merely for illustrative purposes without being intended to show an effective optical system for a camera. The cylindrical mount 5, for further detail of which reference is made to FIGS. 2 and 3, has a relatively thick sidewall formed with a plurality of passages extending therethrough parallel to the axis of the cylinder. These bores or passages may well extend from the forward end 9 of the lens mount all the way to the rear end 10. In such case the bundles of light conductive fibers inserted in the passages 8, as illustrated at 11, would remain as bundles throughout the length of the lens mount just emitting their light at the inner ends 12 of the passages by terminating there, or possibly by extending out beyond the ends 12 and being skived at their extending ends as illustrated at 13 in FIG. 7.

Alternately, however, and for assuring widest distribution of light transmitted through the bundles 11, the passages 8 from about the position shown at 14, would open out into a complete hollow cylinder all around the lens mount. This enables the bundles 11 to be broken apart so that their individual fibers can be widely separated, as shown at 15 in FIG. 4, to substantially fill the hollow cylinder between the interior and exterior walls 16 and 17 of the lens mount 5 as illustrated in FIG. 3. Likewise the fibers 15 may, besides filling the area between the walls 16 and 17, extend out from the right hand 12 of the mount in a mass of individual fibers, as seen at 18. In another form of lens mount the outer wall 17 would be removed, from a position such as 14, to the right-hand end 12.

As is well known in the art of fiber optics bundles of fibers, as shown at 11, take in light at one end and by internal reflection within each fiber transmit the light through the bundle and emit it at the opposite end. Thus a large part of the light introduced at the end of the system, as shown at 9 in FIG. 1, would, if the fibers remain in bundles, be given out from the bundle formation at the opposite end 10 of the construction. This, due to the fact that the light is distributed in all directions from the various emitting positions of the bundles and is quite effective in supplementing the light from the image transmitted through the lenses 6 and 7. In some instances, particularly where a particular purpose is to be served thereby, retaining the fibers in the bundle form and giving off the light from the remote skived end, such as shown at 13 in FIG. 7, is preferable. One particular advantageous arrangement is to have the bundles 11, at their outer ends positioned uniformly about the lens mount but being brought together in the course of their extent to form side-by-side groups along the opposite short edges of the film frame. By skiving the inner ends of the bundles they can be caused to send light across the width of the film frame to light it uniformly.

It will be readily apparent that if the fibers of each bundle are separated and distributed as widely as possible throughout the available space, uniformity of illumination will be achieved in front of the film frame. The presence of so many light sources, provided by light being emitted from the ends of the fibers, in position to give off their light at, or beyond, the end 12 of the lens mount would assure this.

Though an effort has been made, by the showing of fine dotted lines 19 distributed in the space between the end 12 of the lens mount and the image 2 to show how the supplemental light from the fibers is propagated, it is to be understood that the light represented by lines 19 has no image-forming effect. It is merely illumination and it assists the object being imaged by the lenses 6 and 7 by lightening up that image and by moving it up the sensitivity curve of the film so as to get a better image thereon. In some ways the image is akin to the image which would be produced in a film by utilizing light of considerable greater intensity coming from the object through the camera lenses.

If the situation were one where increase in the light intensity was not feasible, so to get a proper image with the available light the cameraman would expect to have to change to a faster film, that change is generally rendered unnecessary by the invention. This is because the invention arrangement provides for introducing more of the light from the same light source in front of the film frame to achieve an effective image without the necessity of increasing the film speed.

With regard to the lens mount shown at 4 in FIG. 1, it of course is to be understood that the showing is purely for illustrative purposes, since, as is known in the art, such lens mounts can take a variety of forms, and can contain various combinations of lenses. Quite commonly they are stepped up from one set of lenses extending outwardly of the camera, which outwardly extending portion may also contain the iris diaphragm and the control ring therefor, as well as the focusing ring. The stepped up, or enlarged ring portion, may carry one or more other sizes of lenses, either within the forward part of the camera housing, or still extending outwardly from it. Some lens mounts and the supporting elements therefore may readily enable passages to be bored therethrough in order to admit additional light into the area in front of the picture frame. In other instances, special provision may have to be made for providing these holes, or passages, but preferably they should be kept as close as can reasonably be done to the imaging lenses, and they must of course open out into the zone in front of the film frame.

FIGS. 5 and 6 illustrate the use of multiaperture diaphragm made of two thin superposed annuli mounted for rotation on the forward end of the lens mount. Thus, in FIG. 5 a modified form of lens mount, generally indicated at 24, terminates at its forward end in a channel retaining ring 25, whose radially inturned portion 26 serves to retain annuli 27 and 28 in overlapping rotational relationship at the forward end of the lens mount. The annuli 27 and 28 would normally be provided with the same number of registered apertures of the same size, so that when they are positioned with their apertures aligned, circular openings, such as those shown at 6 in FIG. 2, would be present for passing light directly through the annuli and through the holes or passages provided in the lens mount. When, however, the outer annulus 28 is rotated slightly with respect to the inner one 27, a restriction of the apertures therethrough will take place producing what is known as a cateye opening, as seen at 29 in FIG. 6. Obviously, various sizes of cateye openings will result, depending on the extent of rotation of the annulus 28 with respect to the annulus 27. If that rotation is of sufficient extent the light passages will be cut off entirely.

In some instances, of course, it is only necessary to have one annulus mounted for rotation at the forward end of the lens mount inasmuch as the holes at the opening end of the passages bored through the lens mount will themselves provide the apertures for a stationary annulus. By utilizing pairs of annuli, however, combined effects of variation in light intensity along with various color effects can be achieved.

This is illustrated in the showing in FIG. 8 of an annulus 30 having six openings 31 therethough which in sequence have band-pass filters therein selectively transmitting red light 32, green light 33, and blue light 34, for control of the supplementary illumination given to each layer of the color film, or to each color record if other than a multilayer process is used. Obviously sets of filters for other than 3 different colors may be provided. Even a single color can be used in order to achieve special effects.

As examples of color arrangements, the array of fiber bundles can be selected so that for an exterior scene the top half of the picture would be enhanced with a blue exposure, while the bottom half would receive a green exposure increment. If a conflagration scene is being photographed, filters can be used to give a red-orange glow all over, or an alleged moonlight scene can be photographed in daylight by giving a soft, misty, blue haze over all of it.

As already indicated, the annulus 30 carrying the desired color filters can be used alone, or can be used in place of the stationary annulus 27, as seen in FIG. 5, with the overlapping annulus 28 merely having a stopping function. Conversely, the overlapping annulus 28 can have a different number of openings from those illustrated so that various positions of the annulus 28 will block off the light passages to some of the color filters, or fiber bundles, while leaving the passage to others of them exposed.

Instead of utilizing separate color filters overlying openings or bundle ends, the outer bundle ends themselves can be coated to act as color filters.

Though in the foregoing the introduction of additional light has been achieved through means extending parallel to the lens axis, the invention is not limited thereby. Such introduction may, if desired, or if existing camera structure requires it, be effected at an angle to the lens axis. In fact introduction at a considerably different angle to the axis may be achieved. Such a situation is illustrated diagrammatically in FIGS. 9 and 10.

In FIGS. 9 and 10 a lens mount is generally indicated at 40 with a main portion 41 carrying a lens 42 and a smaller extension 43. The extension 43 is formed at spaced positions around its periphery with holes 44 therethrough to let light into the interior of the lens mount at the inner end thereof.

Means for directing light into the interior 45 of the mount portion 43 is provided by mirrors 46 pivotally mounted at 47 above the holes 44 by means of supports 48. The pivotal mounting 47 enables the mirrors to be moved to whatever position is desired to best direct the exterior light in through the holes 44.

The mirrors can, of course, be replaced by prisms. Also means for varying the color and/or intensity of the light admitted through the holes 44 can be employed as pointed out above. Additionally the holes 44 may be in some other suitable portion of the mount, mount housing, or camera wall itself if called for by the structures involved.

It will be clear to those skilled in this art that the practice of the invention lends itself readily to various modifications. The several modifications disclosed are only by way of illustration. It is obvious, for example, that control of light characteristics in other ways, and control of other light characteristics could be effected without departing from the spirit or scope of the invention.

I claim:

1. In photographic apparatus, a film plane, an imaging lens to direct light from an object onto said film plane, and means to direct additional light onto said film plane to produce an overall exposure above the threshold value of the film, said means including light-passing passages to direct ambient light onto said film plane and said means being positioned outwardly about said imaging lens, a housing for said imaging lens, said means to direct additional light being formed as openings through said housing.

2. In photographic apparatus, a film plane, an imaging lens to direct light from an object onto said film plane, and means to direct additional light onto said film plane to produce an overall exposure above the threshold value of the film, said means including nonimage-forming light-transmitting means to direct ambient light onto said film plane, said means being positioned outwardly about said imaging lens, a housing for said imaging lens, said means to direct additional light formed as openings through said housing, and light-filtering means mounted in said openings.